United States Patent
Hsiao et al.

(10) Patent No.: US 8,542,224 B2
(45) Date of Patent: Sep. 24, 2013

(54) DISPLAY CLIP SYSTEM AND TIMING CLIP CONTROL METHOD THEREOF

(75) Inventors: Chung-Chih Hsiao, Taoyuan (TW); Chiao-Lin Huang, Taoyuan (TW)

(73) Assignee: Chunghwa Picture Tubes, Ltd., Padeh, Taoyuan (TW)

( * ) Notice: Subject to any disclaimer, the term of this patent is extended or adjusted under 35 U.S.C. 154(b) by 351 days.

(21) Appl. No.: 13/149,537

(22) Filed: May 31, 2011

(65) Prior Publication Data

US 2012/0105405 A1    May 3, 2012

(30) Foreign Application Priority Data

Oct. 29, 2010   (TW) .............................. 99137210 A

(51) Int. Cl.
*G06F 3/038* (2013.01)
*G09G 5/00* (2006.01)

(52) U.S. Cl.
USPC .......................................................... 345/208

(58) Field of Classification Search
USPC ............... 345/94, 95, 98–100, 204, 208, 210, 345/212, 213; 348/441, 447, 459
See application file for complete search history.

(56) References Cited

U.S. PATENT DOCUMENTS

2006/0092109 A1   5/2006   Hsu

FOREIGN PATENT DOCUMENTS

| CN | 101221742 A | 7/2008 |
|---|---|---|
| CN | 101520998 A | 9/2009 |
| CN | 101699552 A | 4/2010 |
| TW | I277050 | 3/2007 |
| TW | 200933568 | 8/2009 |

*Primary Examiner* — Adam R Giesy
*Assistant Examiner* — Gustavo Polo
(74) *Attorney, Agent, or Firm* — Muncy, Geissler, Olds & Lowe, PLLC

(57) ABSTRACT

A display clip system and a timing clip control method thereof are provided. The clip system is connected to a gate driver circuit, and includes a timing controller and a clip module. According to a system input signal and its frame rates, the timing controller generates an enable signal, a clip trigger signal, and a base working signal. The clip module adjusts the base working signal by using the enable signal and the clip trigger signal. Then, the base working signal carries a first clip voltage to output to the gate driver circuit. When the frame rate changes, the timing controller adjusts trigger points and trigger time lengths of the enable signal and the clip trigger signal, and the clip module adjusts the base working signal. Then, the base working signal carries a second clip voltage equal to the first clip voltage to output to the gate driver circuit.

8 Claims, 6 Drawing Sheets

DISPLAY CLIP SYSTEM AND TIMING CLIP CONTROL METHOD THEREOF

CROSS-REFERENCE TO RELATED APPLICATION

This application claims the benefit of Taiwan Patent Application No. 099137210, filed on Oct. 29, 2010, which is hereby incorporated by reference for all purposes as if fully set forth herein.

BACKGROUND OF THE INVENTION

1. Field of Invention

The present invention relates to a timing controller and a timing control method of a liquid crystal panel, and more particularly to a clip system and a timing clip control method, capable of providing a base working signal and a clip voltage of the same signal information before and after a frame rate of a system signal changes.

2. Related Art

Currently, requirements of energy saving of electronic devices have become one of major criteria in design performed by manufacturers, which is also true to active matrix displays, such as liquid crystal displays and Organic Light-Emitting Diode (OLED) displays. Therefore, manufacturers research and develop a method for decreasing power consumption of a display in various operating environments by adjusting a frame rate of a working signal. For example, during working, a frame rate of a base working signal provided by a timing controller of a display is 60 Hz, and during a standby period, the frame rate of the base working signal provided by the timing controller is 40 Hz, and a charging time length of each liquid crystal element is longer than that in the environment in which the frame rate is 60 Hz.

Additionally, during working, a base working signal is transmitted to each gate line one by one to open a semiconductor channel layer of a Thin Film Transistor (TFT) element that controls charging time of a liquid crystal unit connected to the gate line, so that a pixel data signal can be transmitted to a drain from a source after passing through the opened semiconductor layer, and charge the liquid crystal unit. When each of the arranged liquid crystal units is charged, the base working signal is affected by electric impedance caused by the liquid crystal units of a increasing number and through which the base working signal passes, such that a waveform of the base working signal deforms gradually, thus resulting in inconsistent charging charges of the liquid crystal units in the process. Therefore, the manufacturers dispose a clip module between the timing controller and the gate driver circuit, and the clip module is used to clip the base working signal so as to alleviate the influence from the electric impedance of the liquid crystal unit and maintain a voltage waveform of the base working signal provided to the liquid crystal unit, thus balancing the charging charges of the liquid crystal units.

However, after the frame rate is switched, the charging time lengths of the liquid crystal elements become inconsistent, which varies the imaging luminance of a liquid crystal panel, thus resulting in screen transient flickering. In addition, the change of the frame rate results in an inconsistent waveform of a clip voltage generated by a clip module, which leads to inconsistent charging power of charging charges, thus resulting in deteriorated screen transient flickering.

SUMMARY OF THE INVENTION

The present invention is directed to a clip system and a timing clip control method thereof, capable of providing a clip voltage and a working signal of the same signal information when a frame rate changes.

In order to solve the above problems, the present invention provides a display clip system, which is connected to a gate driver circuit of a display. The clip system comprises a timing controller and a clip module.

According to a system input signal, the timing controller is used to generate a first output enable signal, a first clip trigger signal, and a base working signal, whose frame rates are the same as a frame rate of the system input signal. When the frame rate of the system input signal changes, the timing controller adjusts the first output enable signal and the first clip trigger signal to a second output enable signal and a second clip trigger signal according to the change of the frame rate, and output the second output enable signal and the second clip trigger signal. The clip module is used for receiving the base working signal, the first output enable signal, and the first clip trigger signal, adjusting the base working signal by using the first output enable signal and the first clip trigger signal to form a first clip voltage and output the first clip voltage to the gate driver circuit, receiving the second output enable signal and the second clip trigger signal, and adjusting the base working signal by using the second output enable signal and the second clip trigger signal to form a second clip voltage equal to the first clip voltage and output the second clip voltage to the gate driver circuit. A trigger time length of the first clip trigger signal equals a trigger time length of the second clip trigger signal, a trigger time length of the first output enable signal equals a trigger time length of the second output enable signal, a time interval between a trigger point of the first clip trigger signal and a trigger point of the first output enable signal equals a time interval between a trigger point of the second clip trigger signal and a trigger point of the second output enable signal, so that a charging time length and charging charges of a liquid crystal element connected to the gate driver circuit remain the same before and after the frame rate changes.

In order to control the timing, the present invention provides a signal timing clip control method, which is applicable in a timing controller and a clip module of a display, and the clip module is connected to a gate driver circuit. The signal timing clip control method comprises: generating, by the timing controller, a first output enable signal, a first clip trigger signal, and a base working signal, whose frame rates are the same as a frame rate of a system input signal, according to the system input signal; adjusting, by the clip module, the base working signal according to the first output enable signal and the first clip trigger signal to form a first clip voltage, and outputting the base working signal carrying the first clip voltage to the gate driver circuit; and adjusting, by the timing controller, the first output enable signal and the first clip trigger signal to a second output enable signal and a second clip trigger signal according to change of the frame rate when the timing controller judges that the frame rate of the system input signal is changed. A trigger time length of the first clip trigger signal equals a trigger time length of the second clip trigger signal, a trigger time length of the first output enable signal equals a trigger time length of the second output enable signal, a time interval between a trigger point of the first clip trigger signal and a trigger point of the first output enable signal equals a time interval between a trigger point of the second clip trigger signal and a trigger point of the second output enable signal. The signal timing clip control method further comprises: adjusting, by the clip module, the base working signal by using the second output enable signal and the second clip trigger signal to form a second clip voltage equal to the first clip voltage, and outputting the base working signal carrying the second clip voltage to the gate driver circuit.

The characteristics of the present invention are as follows. In a clip system disclosed by the present invention, when system input signals of different frame rates are obtained, base working signals carrying the same clip voltage and having the same trigger time length are still provided, so that a charging time length and charging charges of a liquid crystal unit that receives the base working signal for charging remain the same before and after the frame rate switches, thus steadying imaging luminance and avoiding screen transient flickering. Moreover, the clip system disclosed by the present invention is applicable to existing active matrix display structures, and is applicable to existing active matrix display production lines, so that manufactures are not required to modify production line structures, no additional design and production cost is incurred, and the clip system can be applied to various active matrix displays, thus having a higher product practicability.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Preferred embodiments of the present invention are described below in detail with reference to the accompanying drawings.

Figure 1:
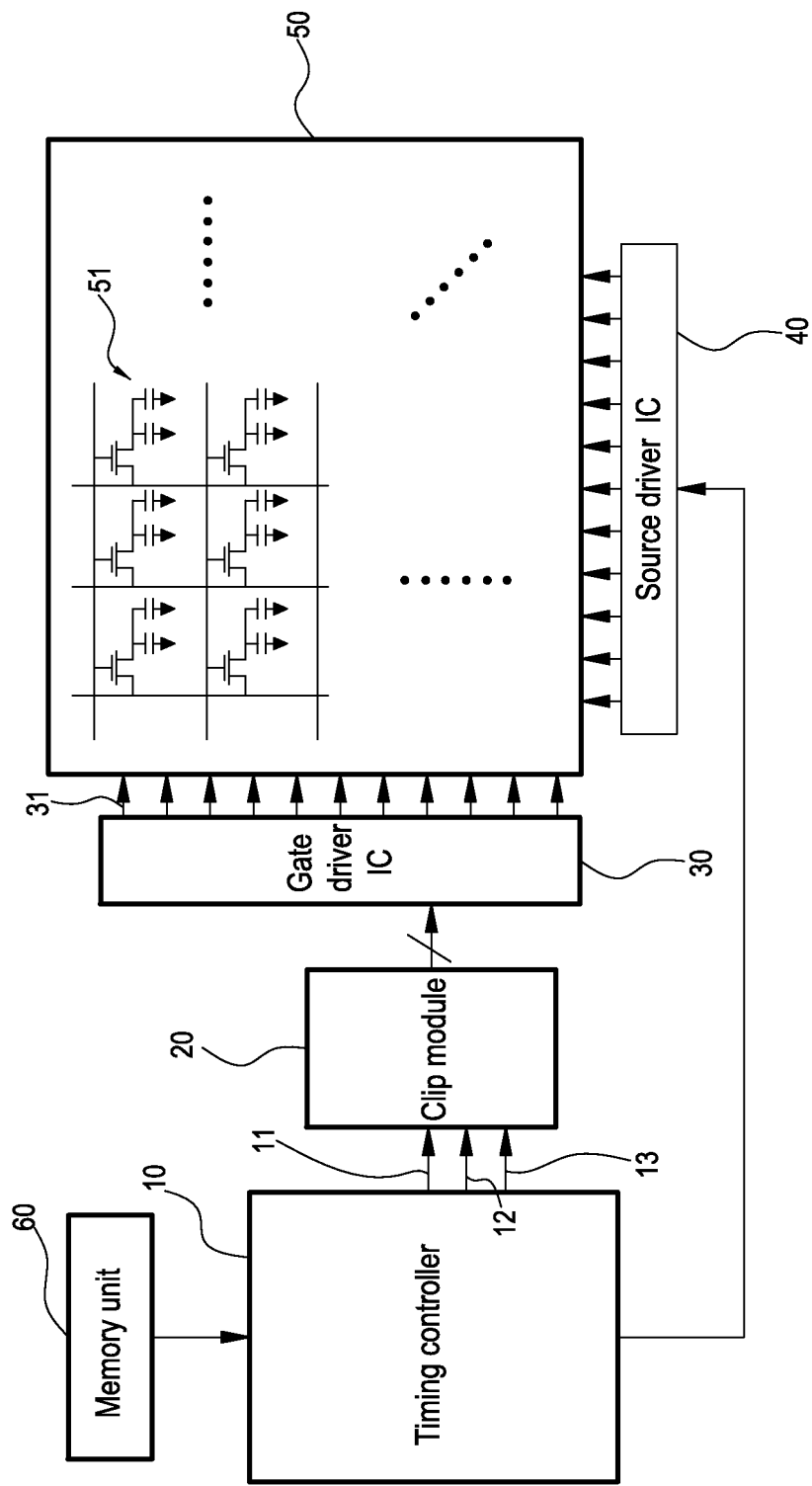
FIG. 1 is a schematic architectural view of a first clip system according to an embodiment of the present invention.
Figure 2A:
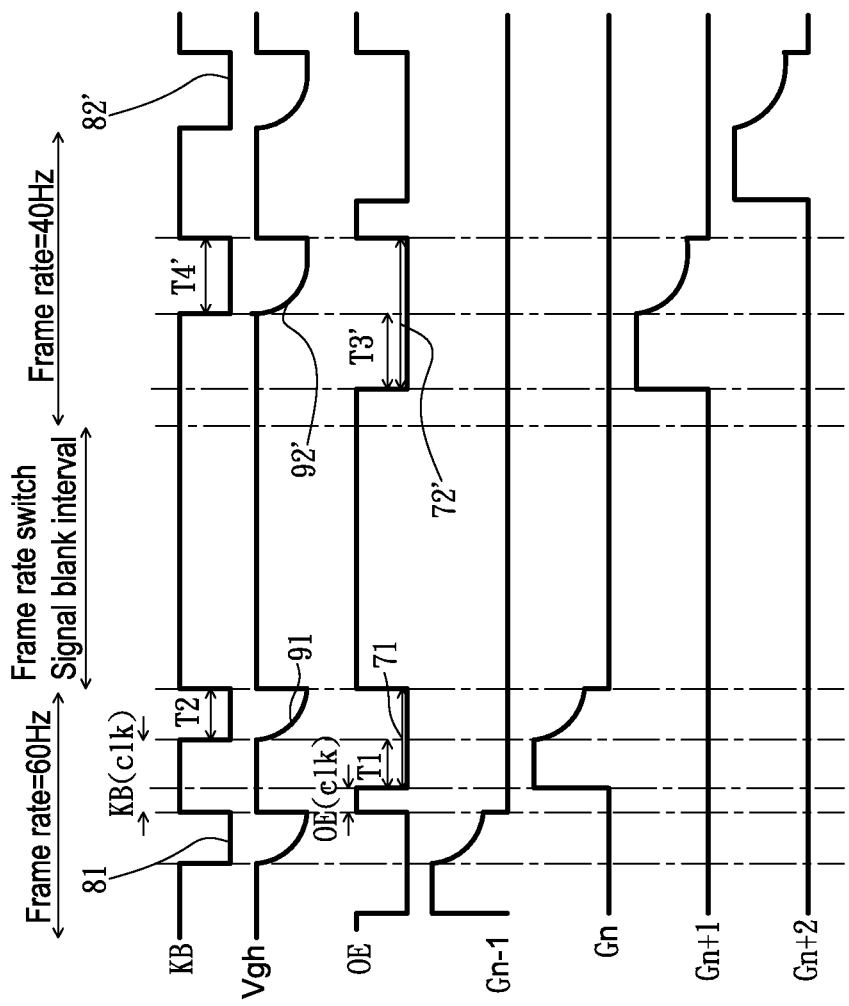
FIG. 2A and FIG. 2B are timing diagrams before and after a frame rate is switched according to an embodiment of the present invention.
Figure 2B:
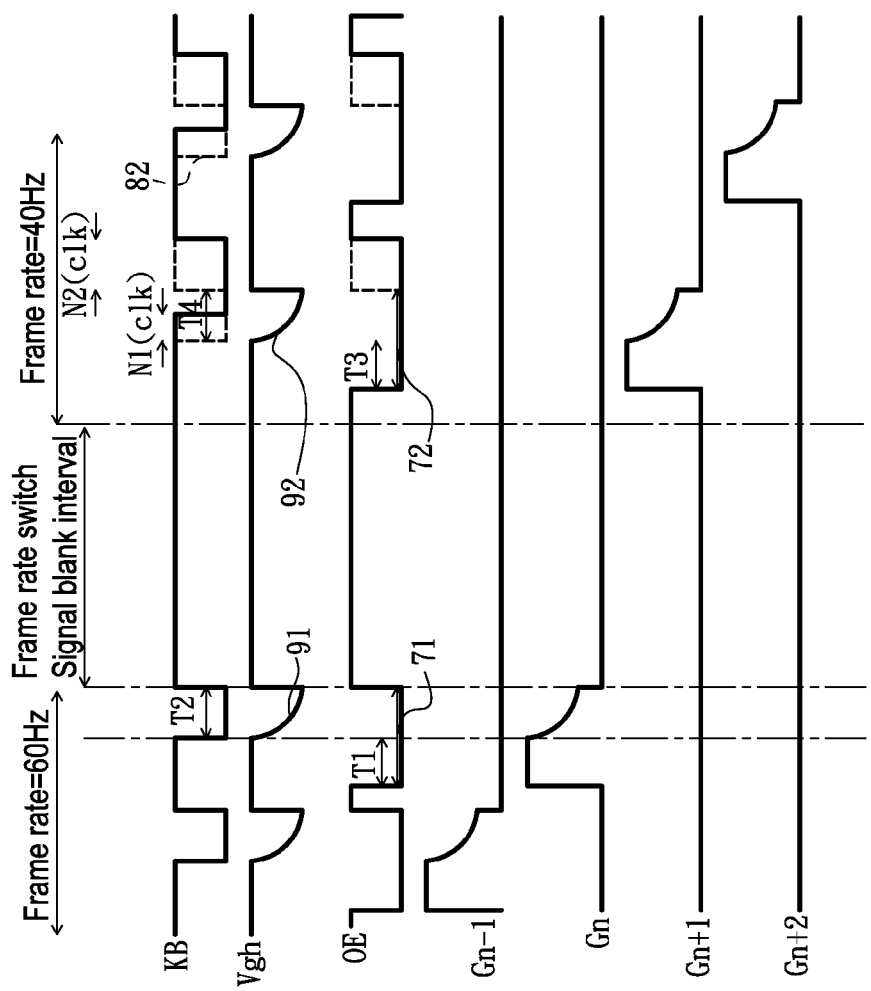

Referring to FIG. 1, a schematic structural view of a clip system according to an embodiment of the present invention is shown. Referring to FIG. 2A and FIG. 2B together, it should be noted that, a liquid crystal panel is taken as an example in the following embodiments, but the techniques disclosed by the present invention are applicable to liquid crystals, OLEDs, and any other type of active matrix displays, and are not limited to the liquid crystal displays and liquid crystal panels.

The system includes a timing controller 10 and a clip module 20. The timing controller 10 is electrically connected to the clip module 20, and the clip module 20 is electrically connected to a gate driver circuit 30 of a liquid crystal panel 50. The timing controller 10 is also connected to multiple source driver circuits 40 to provide a pixel data signal to the source driver circuits 40, and controls the source driver circuits 40 and the gate driver circuit 30 to send the pixel data signal to each liquid crystal unit 51 of the liquid crystal panel 50, so that a screen performs displaying and updating.

The timing controller 10 is a combination of a timing control circuit and a program (such as firmware) executed by the timing control circuit. The timing controller 10 is used to obtain a system input signal provided by an external device or the system, and generate a first output enable signal (1st OE signal) 71, a first clip trigger signal 81, and a base working signal V-gate-high (Vgh) which are of the same frame rate as that of the system input signal. All of the three signals, together with a second output enable signal (2nd OE signal) 72 and a second clip trigger signal 82 in the following, are sent to the clip module 20 through a clip trigger control line 12, an output enable control line 11, and a working signal control line 13. It should be noted that, the clip module 20 transmits the base working signal and the first output enable signal 71 to the gate driver circuit 30. According to a trigger point (in this example, the signal is from high to low), a trigger time length, and the number of trigger circles of the first output enable signal 71, the gate driver circuit 30 determines a gate line 31 (Gn) to which the base working signal should be transmitted, so as to open a semiconductor channel layer of a TFT element that controls charging time of the liquid crystal unit 51 connected to the gate line 31 (Gn), so that a pixel data signal can be transmitted to a drain from a source after passing through the opened semiconductor layer, and charge the liquid crystal unit 51.

Moreover, the clip module 20 determines a time period in which clip operation is performed according to the first clip trigger signal 81, so as to adjust the base working signal, generate a first clip voltage 91 in the base working signal, and transmit the base working signal carrying the first clip voltage 91 to the gate driver circuit 30. The first clip voltage 91 affects the gate line 31 that transmits the base working signal, so as to bring a clip effect to the base working signal. The base working signal transmitted by the gate line 31 forms a clip waveform.

When the frame rate of the system input signal changes, the timing controller 10 also makes changes according to the frame rate, so as to adjust the first output enable signal 71 and the first clip trigger signal 81 into a second output enable signal 72 and a second clip trigger signal 82. The clip module 20 determines a time period in which the clip operation is performed according to the second clip trigger signal 82, so as to adjust the base working signal, generate a second clip voltage 92 in the base working signal, and transmit the base working signal carrying the second clip voltage 92 to the gate driver circuit 30. Trigger points and trigger time lengths of the second output enable signal 72 and the second clip trigger signal 82 are adjusted by the timing controller 10, so that the trigger time length of the second clip trigger signal 82 is equal to the trigger time length of the first clip trigger signal 81, the trigger time length of the second output enable signal 72 is equal to the trigger time length of the first output enable signal 71, and a time interval between the trigger point of the second clip trigger signal 82 and the trigger point of the second output enable signal 72 is equal to a time interval between the trigger point of the first clip trigger signal 81 and the trigger point of the first output enable signal 71. Therefore, the signal information (the clip time, the time period, and the waveform) of the first clip voltage 91 is the same as the signal information of the second clip voltage 92. Therefore, the base working signal, in terms of both the signal waveform and the clip waveform, transmitted by each gate line 31 is consistent before and after the switch of the frame rate. Charging charges, the charging time length, and the clip waveform of the liquid crystal unit 51 that receives the base working signal are consistent before and after the switch of the frame rate.

Referring to FIG. 2A and FIG. 2B, timing diagrams before and after the switch of the frame rate are shown, and FIG. 1 is also referred to for better understanding. According to the change of the frame rate of the system input signal, the timing controller 10 calculates a charging time length difference between two different charging time lengths of the liquid crystal element connected to the gate driver circuit 30 when the base working signal carries the first clip voltage 91 and when the base working signal carries a clip voltage to be adjusted 92' after the frame rate changes, so as to adjust trigger points and trigger time lengths of an output enable signal to be adjusted 72' and a clip trigger signal to be adjusted 82' that are provided after the frame rate changes; and calculate and form the second output enable signal 72 and the second clip trigger signal 82, so that the base working signals transmitted by different gate lines 31 are consistent in terms of both the signal waveform and the clip waveform, and the charging charges of the liquid crystal element 51 that receives the base working signal remain the same before and after the change. A calculation example of the base working signal before and after the frame rate changes is described below.

As shown in FIG. 2A, when the liquid crystal panel 50 is working, the timing controller 10 outputs the base working signal (Vgh) with the frame rate being 60 Hz, the liquid crystal element is charged during the period in which the first output enable signal (1st OE) 71 changes from high to low, and each trigger time length is the sum of T1 and T2.

During a standby period of the liquid crystal panel 50, the timing controller 10 outputs the base working signal (Vgh) with the frame rate being 40 Hz, the charging time length of each liquid crystal element is longer than that in the environment in which the frame rate is 60 Hz, and each trigger time length is the sum of T3 and T4. Accordingly, the clip time of the clip operation is also longer than that in the environment in which the frame rate is 60 Hz, and the generated clip waveform does not satisfy requirements either. Here, the second output enable signal 72 and the second clip trigger signal 82 before the adjustment are referred to as the output enable signal to be adjusted 72' and the clip trigger signal to be adjusted 82' temporarily. The clip voltage carried by the base working signal is referred to as the clip voltage to be adjusted 92' temporarily.

It is assumed that T1 is the time interval between the trigger point of the first output enable signal 71 and the trigger point of the first clip trigger signal 81 in a circle when the frame rate is 60 Hz, and T2 is the trigger time length of the first clip trigger signal 81 in the same circle. T3 is the time interval between the trigger point of the second output enable signal 72 and the trigger point of the second clip trigger signal 82 in a circle when the frame rate is 40 Hz, and T4 is the trigger time length of the second clip trigger signal 82 in the same circle. In view of the above, in order that the first clip voltage 91 equals the second clip voltage 92, T1 should be equal to T3, and T2 should be equal to T4. It is assumed that T3' is a time interval between the trigger point of the output enable signal to be adjusted 72' and the trigger point of the clip trigger signal to be adjusted 82', and T4' is the trigger time length of the clip trigger signal to be adjusted 82' in the same circle. In order that T1=T3 and T2=T4, T3' is required to be adjusted to T3, and T4' is required to be adjusted to T4.

As shown in FIG. 2B, in order that T1=T3, a first charging time length difference N1 (clk) is calculated according to a formula (1), a formula (2), and a formula (3) in the following; and a second charging time length difference N2 (clk) is calculated according to a formula (4), a formula (5), and a formula (6). When the frame rate is 40 Hz, the trigger point of the clip trigger signal to be adjusted 82' in the whole clip trigger timing (KB) is adjusted, and is reduced by a time width of N1 (clk), and an end point of the clip trigger signal to be adjusted 82' is reduced by a time width of N2 (clk), so that the trigger point and the trigger time length of the second clip trigger signal 82 are obtained, that is, T4' is adjusted to T4.

Additionally, when the frame rate is 40 Hz, the timing controller 10 adjusts an end point of the output enable signal to be adjusted 72' in the whole output enable timing at the same time, which is reduced by the time width of N2 (clk), so that the trigger point and the trigger time length of the second output enable signal 72 are obtained (that is, T3'+T4' is changed into T3+T4, and T3' is adjusted to T3, thus meeting the above requirements. Therefore, after the output enable signal to be adjusted 72' and the clip trigger signal to be adjusted 82' are adjusted, the above second output enable signal 72 and second clip trigger signal 82 are formed. The clip voltage carried by the base working signal is also changed from the clip voltage to be adjusted 92' to the second clip voltage 92. The signal information of the second clip trigger signal 82, the second output enable signal 72, and the second clip voltage 92 is the same as the signal information of the first clip trigger signal 81, the first output enable signal 71, and the first clip voltage 91. Therefore, before and after the frame rate changes, the charging time lengths of all liquid crystal units 51 are the same ($T_n = T_n + 1$), and the charging charges obtained by all liquid crystal units 51 are the same ($Q_n = Q_n + 1$), so that screen brightness remains the same, thus overcoming the problem of screen flickering.

$$T1 = (KB(clk) - OE(clk)) \times \frac{1}{Dotclk} \quad \text{formula (1)}$$

$$T3 = (KB(clk) - OE(clk) - N1(clk)) \times \quad \text{formula (2)}$$

$$\frac{1}{(Dotclk) \times \frac{\text{Frame Rate after switch}}{\text{Frame Rate before switch}}}$$

$$N1(clk) = \frac{(KB(clk) - OE(clk))}{3} \quad \text{formula (3)}$$

$$T2 = \frac{1}{(\text{Frame Rate}) \times (Vtotal)} - KB(clk) \times \frac{1}{Dotclk} \quad \text{formula (4)}$$

$$T4 = \frac{1}{(\text{Frame Rate}) \times \frac{2}{3} \times (Vtotal)} - \quad \text{formula (5)}$$

$$(KB(clk) + N1(clk) - N2(clk)) \times \frac{1}{Dotclk}$$

$$N2(clk) = \frac{(KB(clk) - Htotal)}{3} + N1(clk) \quad \text{formula (6)}$$

$V_{total}$ is a total number of horizontal lines in one frame, Dotclk is a pixel rate, and $R_{total}$ is a total number of all Dotclk in n horizontal lines.

Referring to FIG. 1, besides calculation by which the timing controller 10 adjusts and generates the second output enable signal 72 and the second clip trigger signal 82, the timing controller 10 may also be electrically connected to a memory unit 60. The memory unit 60 records signal information (trigger points and trigger time lengths) of the first clip trigger signal 81, the second clip trigger signal 82, the first output enable signal 71, and the second output enable signal 72, so that the timing controller 10 reads corresponding signal information according to the frame rate of the system input signal. Moreover, in this embodiment, the rate of the base working signal is 60 Hz, and the frame rate is changed to 40 Hz, but the present invention is not limited thereto. The frame rate of the base working signal may also be 75 Hz, and the frame rate may also be changed to 60 Hz, and alternatively, other available operation rates of the liquid crystal panel 50 may also be applicable.

Figure 3A:
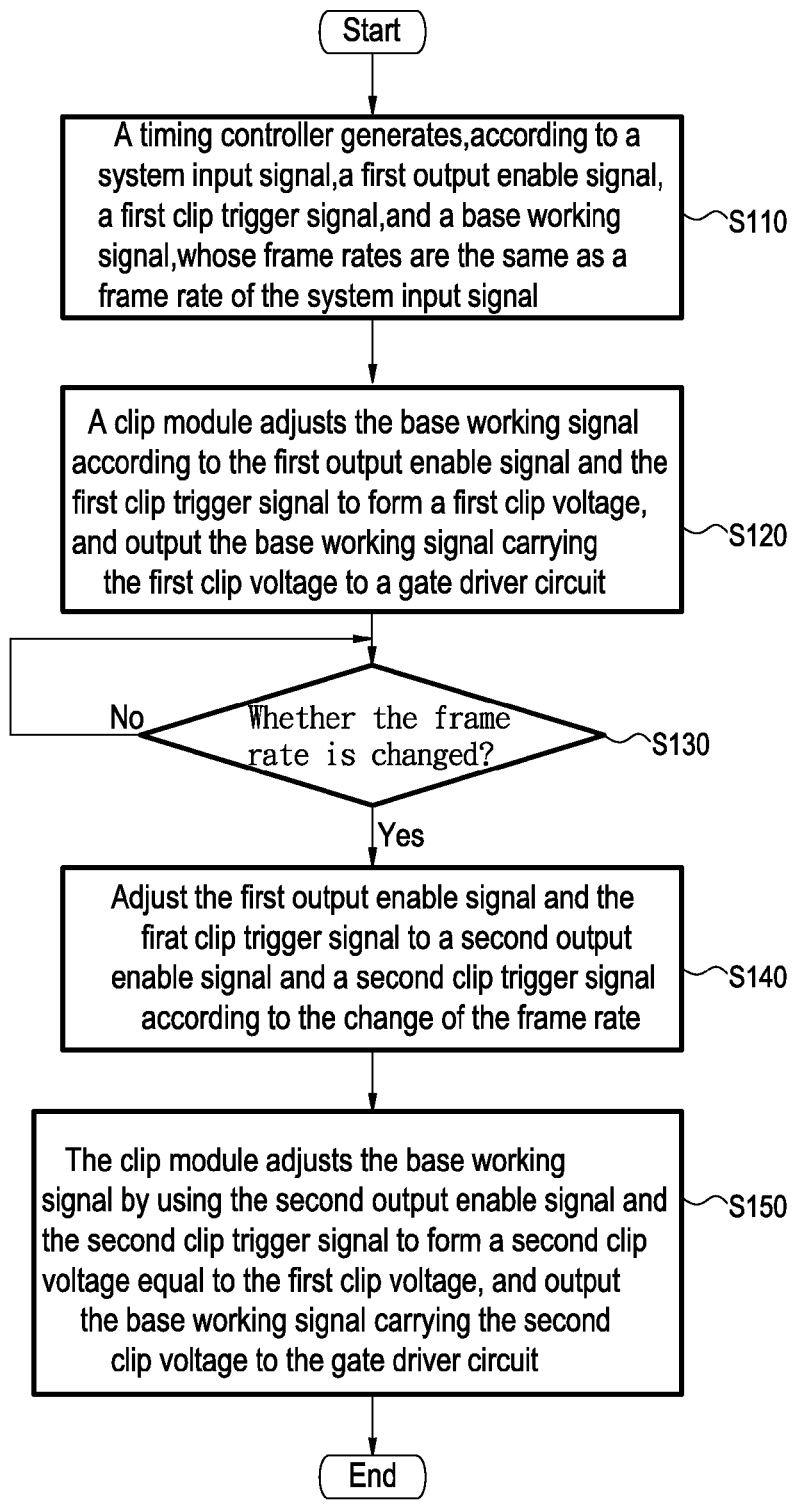
FIG. 3A is a flow chart of a signal timing clip control method of a liquid crystal panel according to an embodiment of the present invention.

FIG. 3A illustrates a signal timing clip control method of the liquid crystal panel 50 according to an embodiment of the present invention, which is applicable to the timing controller 10 in FIG. 1. Refer to FIG. 2A and FIG. 2B, and also refer to FIG. 3B to FIG. 3D, which are detailed schematic flow charts of a process in FIG. 3A, for better understanding. The following describes cases in which the method is specifically applied in two embodiments.

The timing controller 10 generates, according to a system input signal, a first output enable signal 71, a first clip trigger signal 81, and a base working signal, whose frame rates are the same as a frame rate of the system input signal (Step S110). As stated above, when the timing controller 10 obtains the system input signal provided by an external device or a system, the timing controller 10 generates the first output enable signal 71, the first clip trigger signal 81, and the base working signal, whose frame rates are the same as the frame rate of the system input signal, and sends the signals to a clip module 20.

Figure 3B:
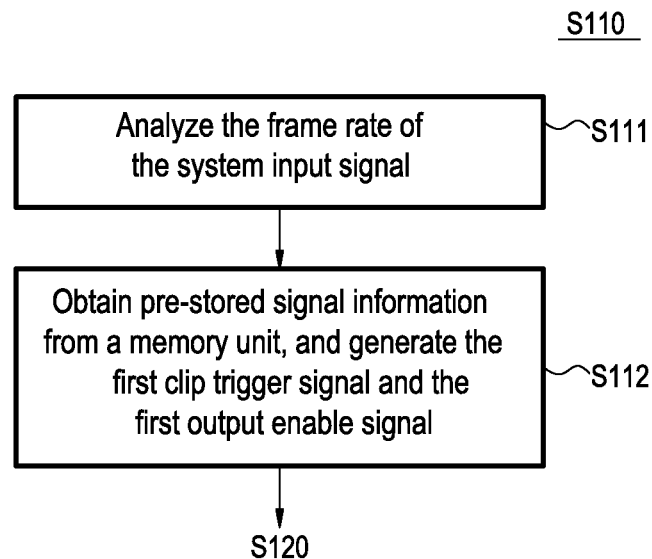
FIG. 3B to FIG. 3D are detailed schematic flow charts of a process in FIG. 3A according to an embodiment of the present invention.

As shown in FIG. 3B, the step may be presented in another manner. As stated above, a memory unit 60 records signal information (including trigger points and trigger time lengths) of the first clip trigger signal 81, a second clip trigger signal 82, the first output enable signal 71, and a second output enable signal 72. The timing controller 10 first analyzes the frame rate of the system input signal (Step S111), obtains pre-stored signal information from the memory unit 60, and generates the first clip trigger signal 81 and the first output enable signal 71 (Step S112).

The clip module 20 adjusts the base working signal according to the first output enable signal 71 and the first clip trigger signal 81 to form a first clip voltage 91, and output the base working signal carrying the first clip voltage 91 to a gate driver circuit 30 (Step S120). The clip module 20 adjusts the base working signal according to the first clip trigger signal 81, so as to transmit the base working signal carrying the first clip voltage 91 to the gate driver circuit 30. The first clip voltage 91 affects a gate line 31 that transmits the base working signal, so as to bring a clip effect to the base working signal. The base working signal transmitted by the gate line 31 forms a clip waveform.

It is judged whether the frame rate is changed (Step S130). When the timing controller 10 judges that the frame rate of the system input signal is changed, the timing controller 10 adjusts the first output enable signal 71 and the first clip trigger signal 81 to a second output enable signal 72 and a second clip trigger signal 82 according to the change of the frame rate (Step S140). As stated above, the timing controller 10 adjusts the first output enable signal 71 and the first clip trigger signal 81 to the second output enable signal 72 and the second clip trigger signal 82 according to the change of the frame rate. The clip module 20 determines a time period in which the clip operation is performed according to the second clip trigger signal 82, adjusts the base working signal, and transmits the base working signal carrying the second clip voltage 92 to the gate driver circuit 30.

A trigger time length of the first clip trigger signal 81 equals a trigger time length of the second clip trigger signal 82. A trigger time length of the first output enable signal 71 equals a trigger time length of the second output enable signal 72. A time interval between a trigger point of the first clip trigger signal 81 and a trigger point of the first output enable signal 71 equals a time interval between a trigger point of the second clip trigger signal 82 and a trigger point of the second output enable signal 72. Therefore, the signal information (clip time, a time period, and a waveform) of the first clip voltage 91 is the same as the signal information of the second clip voltage 92.

Figure 3C:
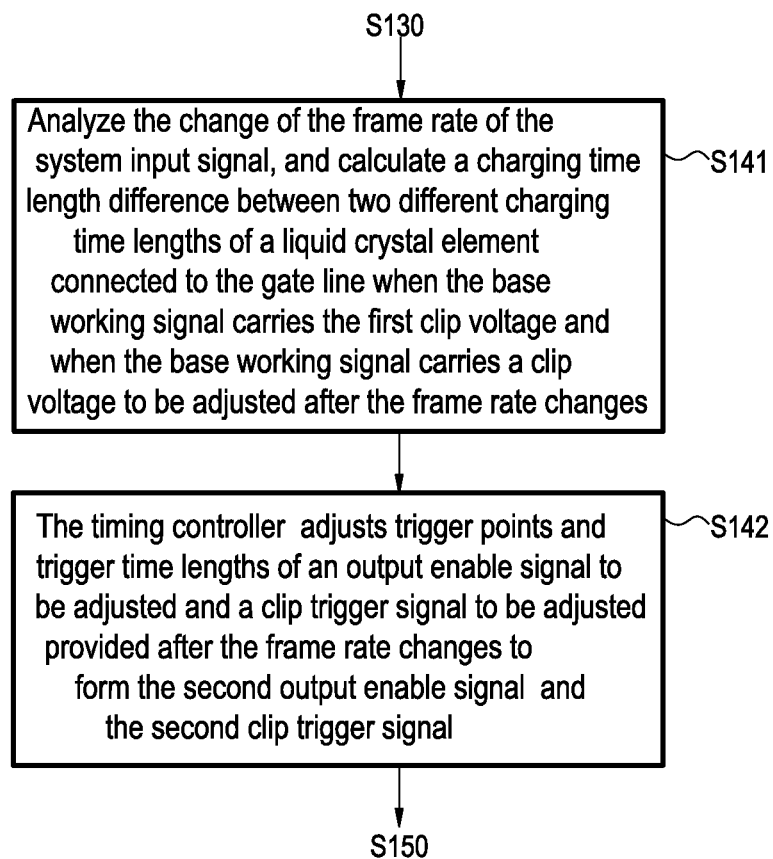

A manner in which the timing controller 10 adjusts the output enable signal and the clip trigger signal is shown in FIG. 3C, and specifically, the timing controller 10 analyzes the change of the frame rate of the system input signal, and calculates a charging time length difference between two different charging time lengths of a liquid crystal element connected to the gate line 31 when the base working signal carries the first clip voltage 91 and when the base working signal carries a clip voltage to be adjusted 92' after the frame rate changes (Step S141). Equations used for the adjustment are as formula (1) to formula (6) and calculation descriptions stated above, and are not described herein again.

Then, the timing controller 10 adjusts trigger points and trigger time lengths of an output enable signal to be adjusted 72' and a clip trigger signal to be adjusted 82' provided after the frame rate changes, so as to form the second output enable signal 72 and the second clip trigger signal 82 (Step S142). The timing controller 10 adjusts the trigger point of the clip trigger signal to be adjusted 82' by reducing the trigger point of the clip trigger signal to be adjusted 82' by a time width of N1 (clk) and reducing an end point of the clip trigger signal to be adjusted 82' by a time width of N2 (clk), so that the trigger point and the trigger time length of the second clip trigger signal 82 are obtained, that is, T4' is adjusted to T4. The timing controller 10 adjusts an end point of the output enable signal to be adjusted 72' at the same time, which is reduced by the time width of N2 (clk), so that the trigger point and the trigger time length of the second output enable signal 72 are obtained (that is, T3'+T4' is changed into T3+T4), and T3' is adjusted to T3, thus meeting the above requirements. After the output enable signal to be adjusted 72' and the clip trigger signal to be adjusted 82' are adjusted, the above second output enable signal 72 and second clip trigger signal 82 are formed.

Figure 3D:
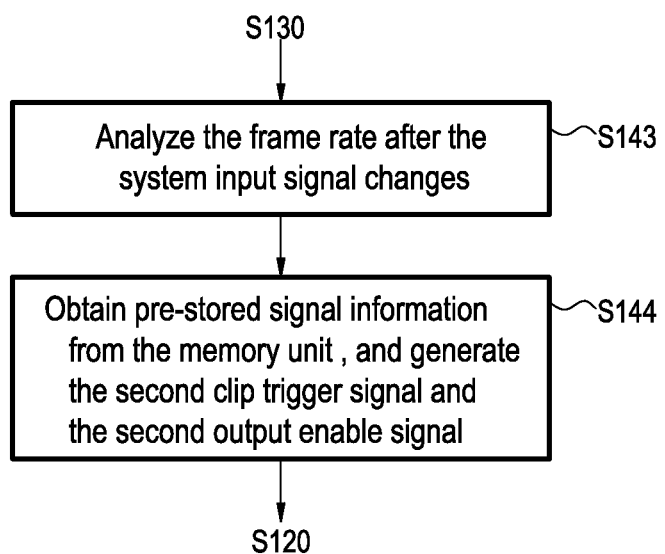

As shown in FIG. 3D, Step S140 may be presented in another manner. As stated above, the memory unit 60 records the signal information (including the trigger points and the trigger time lengths) of the first clip trigger signal 81, the second clip trigger signal 82, the first output enable signal 71, and the second output enable signal 72.

The timing controller 10 first analyzes the frame rate after the system input signal changes (Step S143), obtains pre-stored signal information from the memory unit 60, and generates the second clip trigger signal 82 and the second output enable signal 72 (Step S144).

The clip module 20 uses the second output enable signal 72 and the second clip trigger signal 82 to adjust the base working signal to form the second clip voltage 92 equal to the first clip voltage 91, and output the base working signal carrying the second clip voltage 92 to the gate driver circuit 30 (Step S150). The signal information (the clip time, the time period, and the waveform) of the first clip voltage 91 is the same as the signal information of the second clip voltage 92. Therefore, the base working signals transmitted by the gate lines 31 are consistent in terms of both the signal waveform and the clip waveform. Charging charges, a charging time length, and a clip waveform of a liquid crystal element 51 that receives the base working signal remain the same before and after the frame rate is switched. That is to say, a charge mode of each liquid crystal unit 51 remains the same before and after the frame rate is switched, so that imaging luminance of a liquid crystal panel 50 is steady, thus avoiding screen transient flickering.

When judging that the frame rate of the system input signal is not changed, the timing controller 10 continues to provide the current base working signal, output enable signal, and the clip trigger signal, and detects whether the frame rate is changed continuously.

In view of the above, implementation or embodiments of the technical solutions presented by the present invention to solve problems are described herein, which is not intended to limit the scope of implementation of the present invention. Equivalent modification and improvement in accordance with the claims of the present invention or made according to the claims of the present invention is covered by the claims of the present invention.

What is claimed is:

1. A clip system of a display, connected to a gate driver circuit of the display, comprising:
   a timing controller, for generating a first output enable signal, a first clip trigger signal, and a base working signal whose frame rates are the same as a frame rate of a system input signal according to the system input signal, and outputting the first output enable signal, the first clip trigger signal, and the base working signal, wherein the timing controller adjusts the first output enable signal and the first clip trigger signal to a second output enable signal and a second clip trigger signal for outputting according to the change of the frame rate when the frame rate of the system input signal changed; and
   a clip module, for receiving the base working signal, the first output enable signal, and the first clip trigger signal, adjusting the base working signal by using the first output enable signal and the first clip trigger signal to form a first clip voltage and output the first clip voltage to the gate driver circuit, receiving the second output enable signal and the second clip trigger signal, and adjusting the base working signal by using the second output enable signal and the second clip trigger signal to form a second clip voltage equal to the first clip voltage and output the second clip voltage to the gate driver circuit, wherein a trigger time length of the first clip trigger signal equals a trigger time length of the second clip trigger signal, a trigger time length of the first output enable signal equals a trigger time length of the second output enable signal, a time interval between a trigger point of the first clip trigger signal and a trigger point of the first output enable signal equals a time interval between a trigger point of the second clip trigger signal and a trigger point of the second output enable signal, so that a charging time length and charging charges of a liquid crystal element connected to the gate driver circuit remain the same.

2. The clip system according to claim 1, wherein the frame rates of the first output enable signal and the first clip trigger signal are 60 Hz, and the frame rates of the second output enable signal and the second clip trigger signal are 40 Hz.

3. The clip system according to claim 1, further comprising a memory unit connected to the timing controller, wherein the memory unit records signal information of the first clip trigger signal, the second clip trigger signal, the first output enable signal, and the second output enable signal, so that the timing controller is able to read the corresponding signal information according to the frame rate of the system input signal.

4. The clip system according to claim 1, wherein the timing controller calculates, according to the change of the frame rate of the system input signal, a charging time length difference between two different charging time lengths of the liquid crystal element connected to the gate driver circuit when the base working signal carries the first clip voltage and when the base working signal carries a clip voltage to be adjusted after the frame rate changes, so as to adjust trigger points and trigger time lengths of an output enable signal to be adjusted and a clip trigger signal to be adjusted that are provided after the frame rate changes, and calculate and form the second output enable signal and the second clip trigger signal.

5. A signal timing clip control method, applicable in a timing controller and a clip module of a display, wherein the clip module is connected to a gate driver circuit, the method comprising:
   generating, by the timing controller, according to a system input signal, a first output enable signal, a first clip trigger signal, and a base working signal, whose frame rates are the same as a frame rate of the system input signal;
   adjusting, by the clip module, the base working signal according to the first output enable signal and the first clip trigger signal to form a first clip voltage, and outputting the base working signal carrying the first clip voltage to the gate driver circuit;
   adjusting, by the timing controller, the first output enable signal and the first clip trigger signal to a second output enable signal and a second clip trigger signal according to change of the frame rate when the timing controller judges that the frame rate of the system input signal is changed, wherein a trigger time length of the first clip trigger signal equals a trigger time length of the second clip trigger signal, a trigger time length of the first output enable signal equals a trigger time length of the second output enable signal, a time interval between a trigger point of the first clip trigger signal and a trigger point of the first output enable signal equals a time interval between a trigger point of the second clip trigger signal and a trigger point of the second output enable signal; and
   adjusting, by the clip module, the base working signal by using the second output enable signal and the second clip trigger signal to form a second clip voltage equal to the first clip voltage; and outputting the base working signal carrying the second clip voltage to the gate driver circuit.

6. The signal timing clip control method according to claim 5, wherein the adjusting, by the timing controller, the first output enable signal and the first clip trigger signal to the second output enable signal and the second clip trigger signal according to the change of the frame rate comprises:
   calculating, by the timing controller, according to the change of the frame rate of the system input signal, a charging time length difference between two different charging time lengths of the liquid crystal element connected to the gate driver circuit when the base working signal carries the first clip voltage and when the base working signal carries a clip voltage to be adjusted after the frame rate changes; and
   adjusting, by the timing controller, trigger points and trigger time lengths of an output enable signal to be adjusted and a clip trigger signal to be adjusted provided after the frame rate changes, so as to form the second output enable signal and the second clip trigger signal.

7. The signal timing clip control method according claim 5, wherein the generating, by the timing controller, according to the system input signal, the first output enable signal, the first clip trigger signal, and the base working signal, whose frame rates are the same as the frame rate of the system input signal comprises:

analyzing the frame rate of the system input signal; and obtaining pre-stored signal information from a memory unit, so as to generate the first clip trigger signal and the first output enable signal.

8. The signal timing clip control method according to claim 5, wherein the adjusting, by the timing controller, the first output enable signal and the first clip trigger signal to the second output enable signal and the second clip trigger signal according to the change of the frame rate comprises:

analyzing the frame rate of the system input signal after the frame rate of the system input signal changes; and obtaining pre-stored signal information from a memory unit, so as to generate the second clip trigger signal and the second output enable signal.

* * * * *